(12) United States Patent
Eno (10) Patent No.: US 11,141,020 B2
(45) Date of Patent: Oct. 12, 2021

(54) TRIPODAL COOKING ASSEMBLY

(71) Applicant: Jeffrey Eno, Moosup, CT (US)

(72) Inventor: Jeffrey Eno, Moosup, CT (US)

( * ) Notice: Subject to any disclaimer, the term of this patent is extended or adjusted under 35 U.S.C. 154(b) by 181 days.

(21) Appl. No.: 16/540,312

(22) Filed: Aug. 14, 2019

(65) Prior Publication Data

US 2021/0045574 A1 Feb. 18, 2021

(51) Int. Cl.
*A47J 33/00* (2006.01)
*A47J 37/07* (2006.01)

(52) U.S. Cl.
CPC ............ *A47J 33/00* (2013.01); *A47J 37/0786* (2013.01); *A47J 2037/0795* (2013.01)

(58) Field of Classification Search
CPC ........ A47J 37/0763; A47J 37/04; A47J 33/00; A47J 2037/0795; F24B 1/205; F24B 1/202
USPC ........... 126/30, 9 R, 25 A, 25 AA, 25 R, 29, 126/304 A; 248/163.2, 168, 165, 170, 248/431, 127, 163.1, 178.1, 188.5, 508
See application file for complete search history.

(56) References Cited

U.S. PATENT DOCUMENTS

| | | | |
|---|---|---|---|
| 366,833 A | 7/1887 | Hipwell | |
| 1,064,798 A * | 6/1913 | Walte | F16M 11/28 248/171 |
| 1,412,377 A * | 4/1922 | Suffa | A47J 33/00 248/168 |
| 1,517,825 A * | 12/1924 | Bruneau | F16M 11/10 248/171 |
| 1,573,496 A * | 2/1926 | Jansson | F16M 11/34 248/171 |
| 1,574,894 A * | 3/1926 | Jansson | F16M 11/046 248/171 |
| 1,598,007 A * | 8/1926 | Petrick | F16M 11/245 248/188 |
| 1,639,846 A * | 8/1927 | Green | F41A 23/12 89/40.06 |
| 1,701,153 A * | 2/1929 | Green | F41A 23/12 89/40.06 |
| 1,724,320 A * | 8/1929 | Skultety | A47G 33/12 248/168 |
| 1,795,747 A * | 3/1931 | Viken | F16M 11/34 248/411 |
| 1,844,113 A * | 2/1932 | Beidler | F16M 11/42 403/300 |
| 2,493,978 A * | 1/1950 | Kromer | B66F 13/00 248/171 |
| 2,845,244 A * | 7/1958 | Prokop | F16M 11/18 248/171 |

(Continued)

*Primary Examiner* — Jorge A Pereiro (57) ABSTRACT

A tripodal cooking assembly for grilling over an open fire includes a frame, a shaft, and a grate. The frame comprises a set of three legs, a first brace, and a second brace. The first brace is coupled to each leg proximate to a first end of the leg. The second brace is coupled to each leg between the first end and a midpoint of the leg. The second brace is circumferentially larger than the first brace. A pair of couplers is coupled singly to the first brace and the second brace. The couplers are configured to removably couple to the shaft so that the shaft is perpendicular to the first brace and the second brace. The grate is removably couplable to a lower end of the shaft. The grate is configured to position a food item to be heated by an open flame over which the frame is positioned.

15 Claims, 5 Drawing Sheets

(56) References Cited

U.S. PATENT DOCUMENTS

| | | | | |
|---|---|---|---|---|
| 2,849,202 | A * | 8/1958 | Mccombs | E04H 12/2238 248/515 |
| 2,854,204 | A * | 9/1958 | Growall | F16M 11/34 248/171 |
| 2,940,709 | A * | 6/1960 | Neuwirth | F16M 11/242 248/168 |
| 3,042,209 | A | 7/1962 | Sutherland | |
| D196,019 | S | 8/1963 | Mayer | |
| 3,697,031 | A * | 10/1972 | Glickman | F16M 11/34 248/171 |
| 4,024,851 | A | 5/1977 | Boda | |
| 4,120,280 | A | 10/1978 | Iverson | |
| 4,146,010 | A | 3/1979 | Manska | |
| 4,223,860 | A * | 9/1980 | Prest | A47B 13/06 108/150 |
| 4,324,477 | A * | 4/1982 | Miyazaki | F16M 11/08 248/163.1 |
| 4,438,896 | A * | 3/1984 | Hall | F16M 11/046 248/168 |
| 4,832,296 | A * | 5/1989 | Schnepp | G01C 15/004 248/168 |
| 4,988,064 | A * | 1/1991 | Hoshino | F16M 11/2057 248/170 |
| D315,846 | S | 4/1991 | Hatzenbeller | |
| 5,025,715 | A * | 6/1991 | Sir | A47J 33/00 126/30 |
| 5,308,029 | A * | 5/1994 | Bingham | H01Q 1/1235 248/159 |
| 5,931,148 | A * | 8/1999 | Freeman | A47J 37/0704 126/29 |
| 5,944,008 | A * | 8/1999 | Winkel | F24B 1/205 126/25 R |
| 6,035,968 | A * | 3/2000 | Morales | A01M 31/02 182/116 |
| 6,322,027 | B1 * | 11/2001 | Hsu | F16M 11/34 248/177.1 |
| 6,711,993 | B2 | 3/2004 | Robertson | |
| 6,868,849 | B1 | 3/2005 | Endres | |
| 7,063,006 | B1 * | 6/2006 | Spehle | A47J 33/00 126/25 A |
| 7,137,608 | B2 * | 11/2006 | Willey | F16M 11/046 248/519 |
| 10,612,720 | B2 * | 4/2020 | Lin | G03B 17/561 |
| 2002/0017289 | A1 * | 2/2002 | Carr | A47J 37/0704 126/25 R |
| 2005/0241546 | A1 * | 11/2005 | Royse | A47B 37/04 108/44 |
| 2005/0274854 | A1 * | 12/2005 | May | F16M 11/10 248/171 |
| 2006/0042451 | A1 * | 3/2006 | Marnell | G10D 13/065 84/422.3 |
| 2006/0049319 | A1 * | 3/2006 | L. May | G10G 5/00 248/166 |
| 2006/0086869 | A1 * | 4/2006 | Hsieh | F16M 11/046 248/171 |
| 2008/0078914 | A1 * | 4/2008 | Liao | F16M 11/28 248/435 |
| 2009/0072100 | A1 * | 3/2009 | Zierer | F16M 11/34 248/169 |
| 2012/0001038 | A1 * | 1/2012 | Lin | F16M 11/242 248/171 |
| 2014/0053739 | A1 * | 2/2014 | Safar | A47J 37/0754 99/447 |
| 2015/0090857 | A1 * | 4/2015 | Walker | E04H 12/347 248/535 |
| 2015/0330748 | A1 * | 11/2015 | Anzalone | F41J 7/04 273/390 |

\* cited by examiner

TRIPODAL COOKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to cooking assemblies and more particularly pertain to a new cooking assembly for grilling over an open fire.

BRIEF SUMMARY OF THE INVENTION

An embodiment of the disclosure meets the needs presented above by generally comprising a frame, a shaft, and a grate. The frame comprises a set of three legs, a first brace, and a second brace. The first brace is coupled to each leg proximate to a first end of the leg. The second brace is coupled to each leg between the first end and a midpoint of the leg. The second brace is circumferentially larger than the first brace. A pair of couplers is coupled singly to the first brace and the second brace. The couplers are configured to removably couple to the shaft so that the shaft is perpendicular to the first brace and the second brace. The grate is removably couplable to a lower end of the shaft. The grate is configured to position a food item to be heated by an open flame over which the frame is positioned.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new cooking assembly embodying the principles and concepts of an embodiment of the disclosure and generally designated by the reference numeral 10 will be described.

As best illustrated in FIGS. 1 through 6, the tripodal cooking assembly 10 generally comprises a frame 12, which in turn comprises a set of three legs 14, a first brace 16, and a second brace 18. The legs 14 comprises metal angle. The legs 14 comprises aluminum angle.

The first brace 16 is coupled to each leg 14 proximate to a first end 20 of the leg 14 so that the legs 14 are interconnected. The second brace 18 is coupled to each leg 14 between the first end 20 and a midpoint 22 of the leg 14. The second brace 18 is circumferentially larger than the first brace 16 so that the frame 12 is substantially tetrahedrally shaped and configured to position over an open flame.

Figure 3:
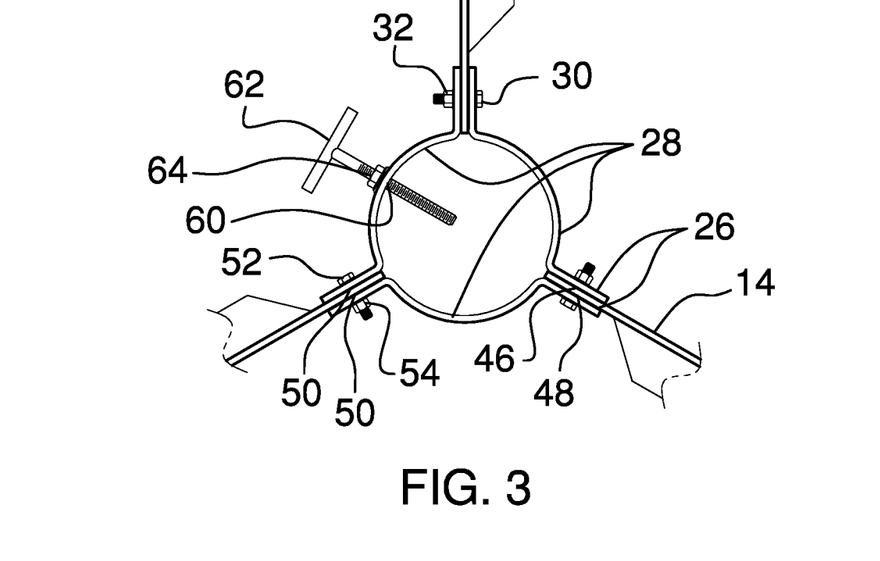
FIG. 3 is a bottom view of an embodiment of the disclosure.
Figure 4:
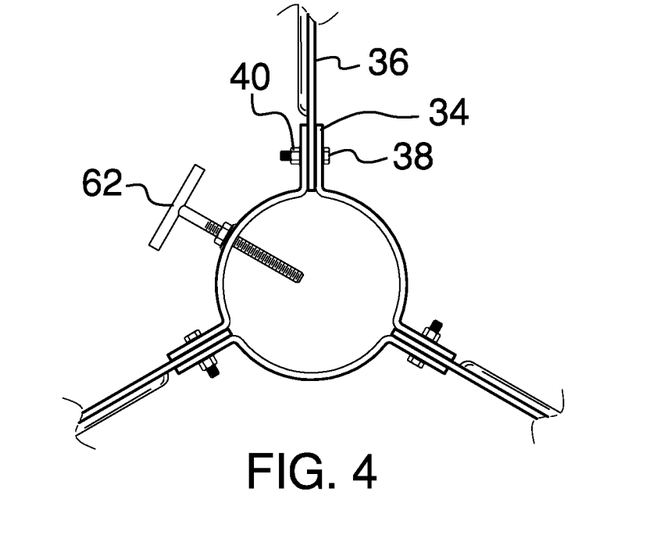
FIG. 4 is a top view of an embodiment of the disclosure.

The second brace 18 and the first brace 16 each comprise a ring 24 and a set of three bars 26. The ring 24 comprises three segments 28, each of which is removably couplable to adjacent segments 28 using a segment bolt 30 and a segment nut 32, as shown in FIGS. 3 and 4. Each bar 26 is coupled to and extends radially from the ring 24. The bar 26 is coupled to a respective leg 14 distal from the ring 24. The bars 26 of the second brace 18 are dimensionally longer than the bars 26 of the first brace 16. Each bar 26 of the second brace 18 comprises a first section 34 that is coupled to a second section 36 so that the second section 36 extends linearly from the first section 34. The first section 34 is removably couplable to the second section 36 using a section bolt 38 and a section nut 40, as shown in FIG. 4.

Each of a set of three plates 42 is coupled to a second end 44 of a respective leg 14. The set of plates 42 is configured to stabilize the frame 12 on a substantially horizontal surface.

Each of a plurality of first connectors 46 is coupled to a respective bar 26 distal from the ring 24. Each of a plurality of second connectors 48 is coupled to a respective leg 14. The second connectors 48 are complementary to the first connectors 46 so that each second connector 48 is positioned to selectively couple to a respective first connector 46 to removably couple the first brace 16 and the second brace 18 to the legs 14.

The second connector 48 and the respective first connector 46 each may comprise a connector hole 50 so that the connector holes 50 are alignable to insert a connector bolt 52, positioning the connector bolt 52 to threadedly couple to a connector nut 54 to couple the first brace 16 and the second brace 18 to the legs 14. The second connector 48 and the respective first connector 46 also may comprise other types of releasable fasteners such as, but not limited to, clamps, clips, spring-loaded pins, and the like.

A pair of couplers 56 is coupled singly to the first brace 16 and the second brace 18. The couplers 56 are configured to removably couple to a shaft 58, which is tubular, so that the shaft 58 is perpendicular to the first brace 16 and the second brace 18.

Each coupler 56 may comprise a hole 60 and a thumbscrew 62, as shown in FIGS. 3 and 4, or other type of reversible fastener such as, but not limited to, clamps, clips, compression fittings, spring-loaded pins, and the like. The hole 60, which is positioned in the ring 24 and is threaded, is positioned to threadedly insert the thumbscrew 62 so that the thumbscrew 62 frictionally couples to the shaft 58. The thumbscrews 62 may be loosened slightly so that the shaft 58 is rotatable relative to the frame 12. The thumbscrews 62 may be loosened further so that the shaft 58 is selectively positionable relative to the first brace 16 and the second brace 18. Each coupler 56 may additionally comprise a coupling nut 64 that is weldedly coupled to the ring 24 so that the coupling nut 64 is aligned with the hole 60. The coupling nut 64 is positioned to threadedly insert the thumbscrew 62.

Figure 1:
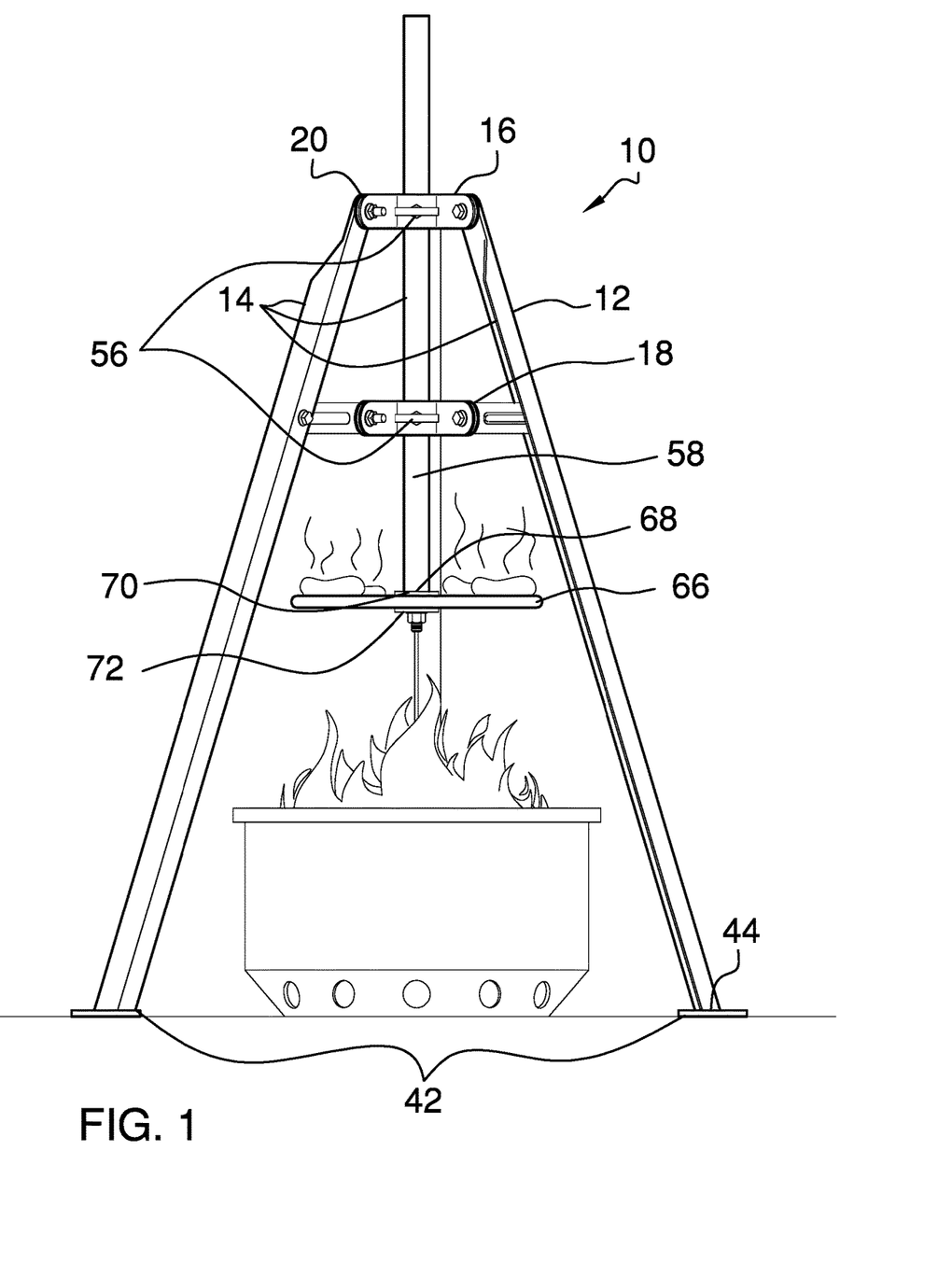
FIG. 1 is an in-use view of a tripodal cooking assembly according to an embodiment of the disclosure.
Figure 2:
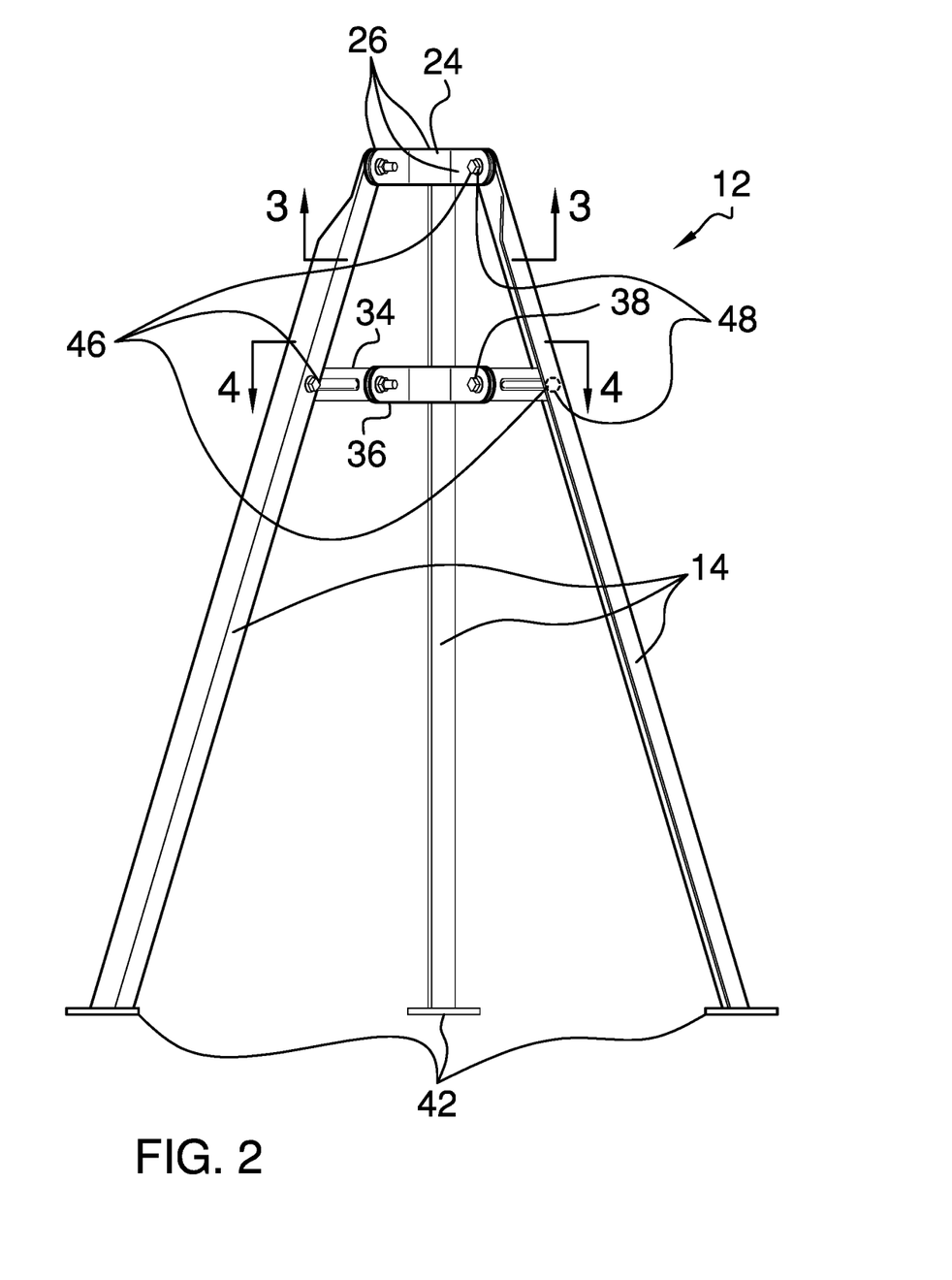
FIG. 2 is a side view of an embodiment of the disclosure.

A grate 66 is removably couplable to a lower end 68 of the shaft 58. The grate 66 is configured to position a food item so that the food item is positioned to be heat by the open flame, as shown in FIG. 1. The grate 66 is at least one of rectangularly shaped, squarely shaped (as shown in FIG. 5), and circularly shaped.

Figure 5:
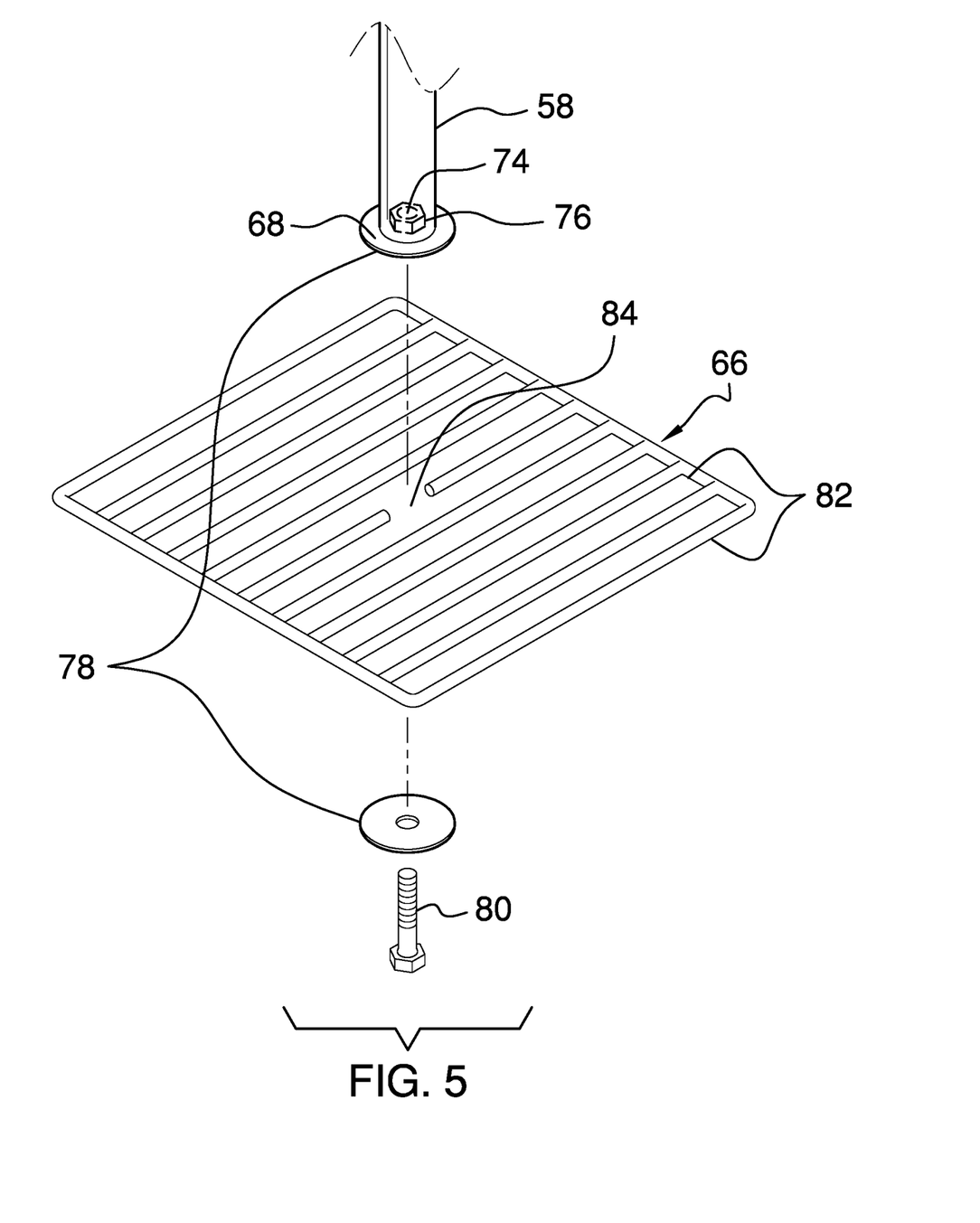
FIG. 5 is an exploded view of an embodiment of the disclosure.

As shown in FIG. 5, a first fastener 70 is coupled to the lower end 68 of the shaft 58. A second fastener 72 is coupled to the grate 66. The second fastener 72 is complementary to the first fastener 70 so that the second fastener 72 is positioned to selectively couple to the first fastener 70 to removably couple the grate 66 to the shaft 58.

The first fastener 70 comprises a threaded channel 74 that extends into the shaft 58. The threaded channel 74 is defined by a channel nut 76 that is coupled to the shaft 58. The second fastener 72 comprises a pair of washers 78 and a grill bolt 80. The washers 78 are positionable on opposing faces 82 of the grate 66, positioning the grill bolt 80 to be inserted through the pair of washers 78 and an orifice 84 in the grate 66. The grill bolt 80 then is positioned to be threadedly inserted into the threaded channel 74 to removably couple the grate 66 to the shaft 58. The second fastener 72 and the first fastener 70 may other types of reversible fasteners such as, but not limited to, clamps, clips, compression fittings, spring-loaded pins, and the like.

Figure 6:
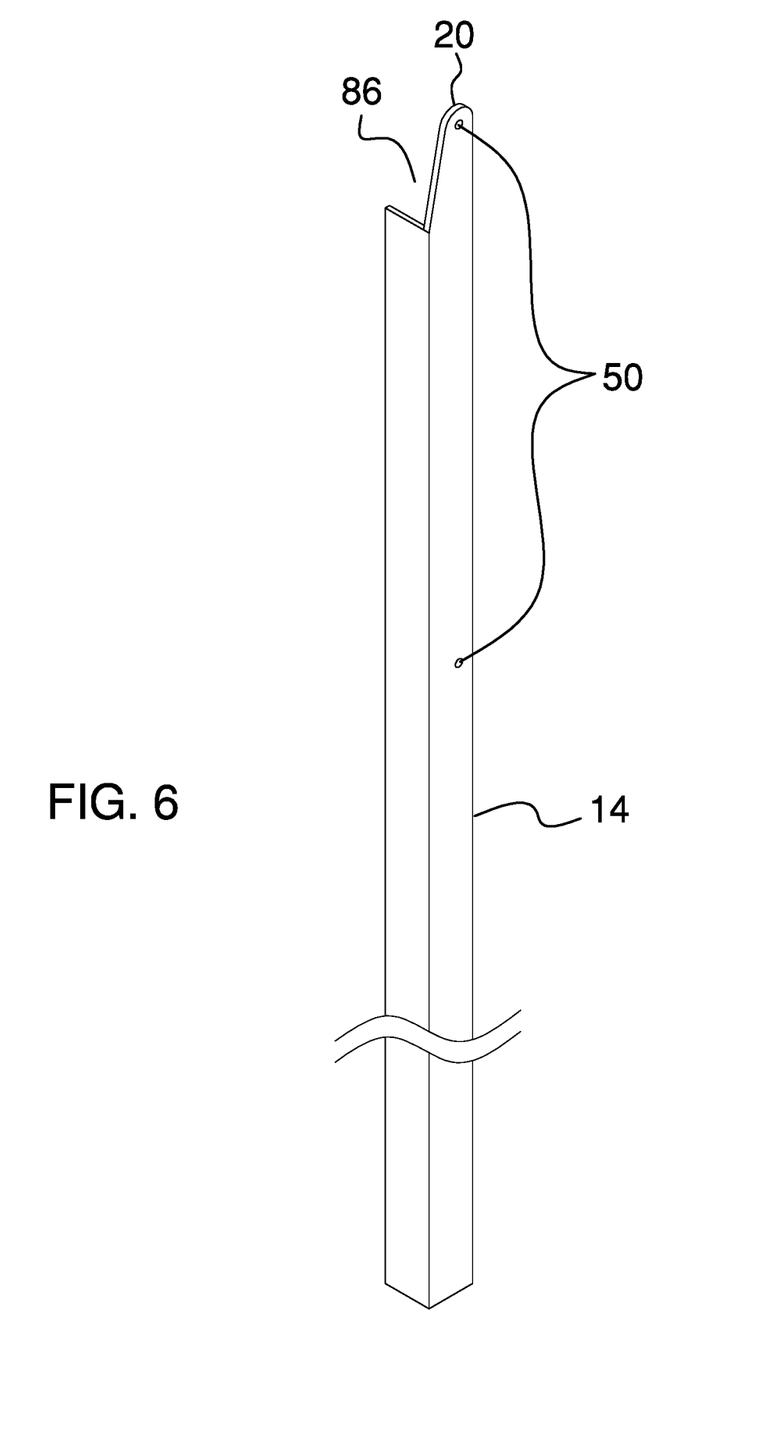
FIG. 6 is a detailed view of an embodiment of the disclosure.

Each of a set of three cutouts 86 is positioned in a respective leg 14 adjacent to the first end 20 of the respective leg 14, as shown in FIG. 6. The cutouts 86 are configured to allow access to the first connectors 46 and the second connectors 48 to removably couple the first brace 16 to the legs 14.

In use, the frame 12, with the shaft 58 and grate 66 installed, is positioned over the open flame. As required, the grate 66 can be positioned relative to the open flame by loosening the thumbscrews 62 and sliding the shaft 58 within the first brace 16 and the second brace 18 until the grate 66 is positioned as desired to heat the food item.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A tripodal cooking assembly comprising:
   a frame comprising a set of three legs, a first brace, and a second brace, the first brace being coupled to each leg proximate to a first end of the leg such that the legs are interconnected, the second brace being coupled to each leg between the first end and a midpoint of the leg, the second brace being circumferentially larger than the first brace such that the frame is substantially tetrahedrally shaped wherein the frame is configured for positioning over an open flame;
   a shaft;
   a pair of couplers coupled singly to the first brace and the second brace, the couplers being configured for removably coupling to the shaft such that the shaft is perpendicular to the first brace and the second brace;
   a grate removably couplable to a lower end of the shaft wherein the grate is configured for positioning a food item positioning the food item for heating by the open flame;
   a first fastener coupled to the lower end of the shaft, the first fastener comprising a threaded channel extending into the shaft; and
   a second fastener coupled to the grate, the second fastener being complementary to the first fastener such that the second fastener is positioned for selectively coupling to the first fastener for removably coupling the grate to the shaft, the second fastener comprising a pair of washers and a grill bolt such that the washers are positionable on opposing faces of the grate positioning the grill bolt for inserting through the pair of washers and an orifice in the grate such that the grill bolt is positioned for threadedly inserting into the threaded channel for removably coupling the grate to the shaft.

2. The assembly of claim 1, further including the second brace and the first brace each comprising a ring and a set of three bars, each bar being coupled to and extending radially from the ring, the bar being coupled to a respective leg distal from the ring, the bars of the second brace being dimensionally longer than the bars of the first brace.

3. The assembly of claim 2, further including the ring comprising three segments, each segment being removably couplable to adjacent segments using a segment bolt and a segment nut.

4. The assembly of claim 2, further including each bar of the second brace comprising a first section coupled to a second section such that the second section extends linearly from the first section.

5. The assembly of claim 4, further including the first section being removably couplable to the second section using a section bolt and a section nut.

6. The assembly of claim 2, further comprising:
 a plurality of first connectors, each first connector being coupled to a respective bar distal from the ring; and
 a plurality of second connectors, each second connector being coupled to a respective leg, the second connectors being complementary to the first connectors wherein each second connector is positioned for selectively, coupling to a respective first connector for removably coupling the first brace and the second brace to the legs.

7. The assembly of claim 6, further including the second connector and the respective first connector each comprising a connector hole such that the connector holes are alignable for inserting a connector bolt, positioning the connector bolt for threadedly coupling to a connector nut for coupling the first brace and the second brace to the legs.

8. The assembly of claim 6, further including a set of three cutouts, each cutout being positioned in a respective leg adjacent to the first end of the respective leg wherein the cutouts are configured for accessing the first connectors and the second connectors for removably coupling the first brace to the legs.

9. The assembly of claim 2, further including each coupler comprising a hole and a thumbscrew, the hole being positioned in the ring, the hole being threaded such that the hole is positioned for threadedly inserting the thumbscrew such that the thumbscrew frictionally couples to the shaft.

10. The assembly of claim 9, further including each coupler comprising a coupling nut weldedly coupled to the ring such that the coupling nut is aligned with the hole wherein the coupling nut is positioned for threadedly inserting the thumbscrew.

11. The assembly of claim 1, further including a set of three plates, each plate being coupled to a second end of a respective leg wherein the set of plates is configured for stabilizing the frame on a substantially horizontal surface.

12. The assembly of claim 1, further including the shaft being tubular.

13. The assembly of claim 1, further including the grate being at least one of rectangularly shaped, squarely shaped, and circularly shaped.

14. The assembly of claim 1, further including the threaded channel being defined by a channel nut coupled to the shaft.

15. A tripodal cooking assembly comprising:
 a frame comprising:
  a set of three legs, the legs comprising metal angle, the legs comprising aluminum angle,
  a first brace coupled to each leg proximate to a first end of the leg such that the legs are interconnected, and
  a second brace coupled to each leg between the first end and a midpoint of the leg, the second brace being circumferentially larger than the first brace such that the frame is substantially tetrahedrally shaped wherein the frame is configured for positioning over an open flame, the second brace and the first brace each comprising:
   a ring, the ring comprising three segments, each segment being removably couplable to adjacent segments using a segment bolt and a segment nut,
   a set of three bars, each bar being coupled to and extending radially from the ring, the bar being coupled to a respective leg distal from the ring, the bars of the second brace being dimensionally longer than the bars of the first brace, each bar of the second brace comprising a first section coupled to a second section such that the second section extends linearly from the first section, the first section being removably couplable to the second section using a section bolt and a section nut, and
   a set of three plates, each plate being coupled to a second end of a respective leg wherein the set of plates is configured for stabilizing the frame on a substantially horizontal surface;
 a plurality of first connectors, each first connector being coupled to a respective bar distal from the ring;
 a plurality of second connectors, each second connector being coupled to a respective leg, the second connectors being complementary to the first connectors wherein each second connector is positioned for selectively coupling to a respective first connector for removably coupling the first brace and the second brace to the legs, the second connector and the respective first connector each comprising a connector hole such that the connector holes are alignable for inserting a connector bolt, positioning the connector bolt for threadedly coupling to a connector nut for coupling the first brace and the second brace to the legs;
 a shaft, the shaft being tubular;
 a pair of couplers coupled singly to the first brace and the second brace, the couplers being configured for removably coupling to the shaft such that the shaft is perpendicular to the first brace and the second brace, each coupler comprising a hole and a thumbscrew, the hole being positioned in the ring, the hole being threaded such that the hole is positioned for threadedly inserting the thumbscrew such that the thumbscrew frictionally, couples to the shaft, each coupler comprising a coupling nut weldedly coupled to the ring such that the coupling nut is aligned with the hole wherein the coupling nut is positioned for threadedly inserting the thumbscrew;
 a grate removably couplable to a lower end of the shaft wherein the grate is configured for positioning a food item positioning the food item for heating by the open flame, the grate being at least one of rectangularly shaped, squarely shaped, and circularly shaped;
 a first fastener coupled to the lower end of the shaft;
 a second fastener coupled to the grate, the second fastener being complementary to the first fastener such that the second fastener is positioned for selectively coupling to the first fastener for removably coupling the grate to the shaft, the first fastener comprising a threaded channel extending into the shaft, the threaded channel being defined by a channel nut coupled to the shaft, the second fastener comprising a pair of washers and a grill bolt such that the washers are positionable on opposing faces of the grate positioning the grill bolt for inserting through the pair of washers and an orifice in the grate such that the grill bolt is positioned for threadedly inserting into the threaded channel for removably coupling the grate to the shaft; and a set of three cutouts, each cutout being positioned in a respective leg adjacent to the first end of the respective leg wherein the cutouts are configured for accessing the first connectors and the second connectors for removably coupling the first brace to the legs.

\* \* \* \* \*